(12) United States Patent
Reich

(10) Patent No.: US 6,476,516 B1
(45) Date of Patent: Nov. 5, 2002

(54) METHOD AND APPARATUS FOR CLASSIFYING SEAT OCCUPANT WEIGHT

(75) Inventor: Daniel Reich, Macomb, MI (US)

(73) Assignee: Siemens VDO Automotive Inc., Auburn Hills, MI (US)

(*) Notice: Subject to any disclaimer, the term of this patent is extended or adjusted under 35 U.S.C. 154(b) by 17 days.

(21) Appl. No.: 09/648,222

(22) Filed: Aug. 25, 2000

Related U.S. Application Data

(60) Provisional application No. 60/152,425, filed on Sep. 3, 1999.

(51) Int. Cl.$^7$ .................................................. B60L 1/00
(52) U.S. Cl. .................................... 307/10.1; 307/9.1
(58) Field of Search ........................... 307/10.1, 9.1; 280/734, 735; 180/271; 177/211, 144; 701/45

(56) References Cited

U.S. PATENT DOCUMENTS

| | | | |
|---|---|---|---|
| 5,413,378 A | | 5/1995 | Steffens |
| 5,474,327 A | * | 12/1995 | Schousek ............... 280/735 |
| 5,539,290 A | * | 7/1996 | Lu et al. ............... 318/565 |
| 5,573,269 A | | 11/1996 | Gentry |
| 5,626,359 A | | 5/1997 | Steffens |
| 5,732,375 A | | 3/1998 | Cashler |
| 5,821,633 A | | 10/1998 | Burke |
| 5,906,393 A | | 5/1999 | Mazur |
| 5,987,370 A | * | 11/1999 | Murphy et al. ............ 701/45 |
| 6,070,115 A | * | 5/2000 | Oestreicher et al. ........ 701/45 |

FOREIGN PATENT DOCUMENTS

| | | |
|---|---|---|
| EP | 0 656 283 B1 | 8/1997 |
| WO | 97 10115 A | 3/1997 |
| WO | 98 14345 A | 4/1998 |
| WO | WO99/24285 A1 | 5/1999 |
| WO | 99 38731 A | 8/1999 |

OTHER PUBLICATIONS

Written Opinion dated Aug. 17, 2001 regarding International Application No. PCT/US00/23681.

* cited by examiner

*Primary Examiner*—Fritz Fleming
*Assistant Examiner*—Robert L DeBeradinis

(57) ABSTRACT

A method and apparatus is provided that classifies a seat occupant into one of several different weight classes based on an estimated value of the seat occupant weight. An occupant's measured weight varies when the occupant's seating position changes or when the vehicle travels over adverse road conditions. The estimated value of the occupant weight is compared to a series of upper and lower weight thresholds assigned to each of the weight classes to generate an occupant weight sample class. Over a period of time, several estimated weight values are compared to the weight class thresholds. Once a predetermined number of consistent and consecutive occupant weight sample classes is achieved, the occupant is locked into a specific occupant weight class. When the weight class is locked, the separation value between the upper and lower thresholds is increased to account for minor weight variations due to adverse road conditions and changes in occupant position. The weight class is unlocked when a predetermined number of inconsistent classes is observed and the process is repeated.

20 Claims, 3 Drawing Sheets

METHOD AND APPARATUS FOR CLASSIFYING SEAT OCCUPANT WEIGHT

RELATED APPLICATION

This application claims priority to provisional application No. 60/152,425 filed on Sep. 3, 1999.

BACKGROUND OF THE INVENTION

1. Field of the Invention

This invention relates to a method and apparatus for classifying the weight of a seat occupant. Specifically, an estimated seat occupant weight is compared to a series of moving thresholds to compile a weight class history that provides a more accurate, stable, and robust weight classification for airbag deployment decisions.

2. Related Art

Most vehicles include airbags for the driver and passenger. It is important to control the deployment force of the airbags based on the size of the driver or the passenger. One way to control the deployment force is to monitor the weight of the seat occupant. If a smaller person such as a child or infant in a car seat is in the passenger seat, the weight on the seat will be less than if an adult occupies the seat.

Current systems for measuring the weight of a seat occupant are complex and expensive. Sensors are placed at a plurality of locations in the seat bottom and the combined output from the sensors is used to determine the weight of the seat occupant. Each sensor experiences a substantially vertical force, due to the weight of the seat occupant, but is also subject to longitudinal and lateral forces caused by acceleration, deceleration, turning, or adverse road conditions. The lateral and longitudinal forces picked up by the sensor incorporate an error component into the weight measurement. These sensors often cannot correct error due to changes in occupant seating position or adverse road conditions.

Some systems attempt to classify seat occupants into predetermined customer-specified classes usually based only on occupant weight. The classification information is then used to modify the deployment of the airbag. These systems do not provide accurate and consistent classification over a wide range of adverse road conditions and/or occupant seating conditions.

Thus, it is desirable to have an improved seat occupant classification system that provides accurate classification by eliminating error caused by adverse road conditions and changes in occupant position.

SUMMARY OF THE INVENTION

A method and apparatus is provided that classifies a seat occupant into one of several different weight classes based on an estimated value of the seat occupant weight. Each of the weight classes has upper and lower thresholds that define the class. Over time, several comparisons are made between the estimated weight and the thresholds of the weight classes and each comparison results in a weight class sample. The seat occupant is assigned a specific weight class designation once a predetermined number of consistent and consecutive weight class samples is achieved. The specific weight class designation remains locked until a certain number of inconsistent weight class samples are observed.

In a disclosed embodiment of this invention, the method for classifying a seat occupant into a weight class includes the following steps. The seat occupant weight is measured resulting in an estimated weight. The estimated weight is compared to a series of weight classes with thresholds to determine a class sample. The previous steps are repeated until a predetermined number of class samples having the same value is achieved and the class sample becomes locked as the occupant weight class.

Additional steps include generating an occupant weight class signal corresponding to the locked occupant weight class, transmitting the occupant weight class signal to a control unit, and modifying deployment of an airbag based on the occupant weight class signal. The weight class is unlocked when a predetermined number inconsistent class samples is observed. When the class is unlocked, the process repeats.

Once the occupant has been classified into a weight class, that class becomes the known class for the next comparison. Preferably, each weight class is assigned an upper threshold and a lower threshold. At each iteration, the estimated weight is compared to the upper and lower thresholds for the last known weight class. The new class sample is designated the same as the last known weight class if the estimated weight is between the upper and lower thresholds for the last known weight class. The sample is set equal to a next higher weight class if the estimated weight is greater than the upper threshold for the last known weight class or the class sample is set equal to a next lower weight class if the estimated weight is less than the lower threshold for the last known weight class.

In one disclosed embodiment, the value of the upper threshold of the class sample is increased by a first predetermined amount and the value of the lower threshold of the class sample is decreased by a second predetermined amount after the class sample is locked. The upper and lower thresholds are returned to their initial values when the class sample becomes unlocked.

The occupant weight classification system includes a sensor assembly for measuring the weight of a seat occupant to generate an estimated weight signal. A series of weight class data is also included where each weight class has an upper threshold and a lower threshold. The system includes a control unit for receiving the estimated weight signal, comparing the signal to the upper and lower thresholds to assign the signal an appropriate weight class designation, and for locking the signal into an occupant specific weight class when a predetermined number of consistent and consecutive weight class designations is achieved. The control unit generates and transmits a control signal to an airbag controller to modify deployment of the airbag based on the occupant specific weight class.

The subject invention uses varying weight class thresholds and class sample histories to produce a more stable, accurate and robust classification process that reduces errors caused by changes in occupant seating position and adverse road conditions. The more accurate classification system is used to generate control signals, which are used to modify airbag deployment.

These and other features of the present invention can be best understood from the following specification and drawings, the following of which is a brief description.

DETAILED DESCRIPTION OF AN EXEMPLARY EMBODIMENT

Figure 1:
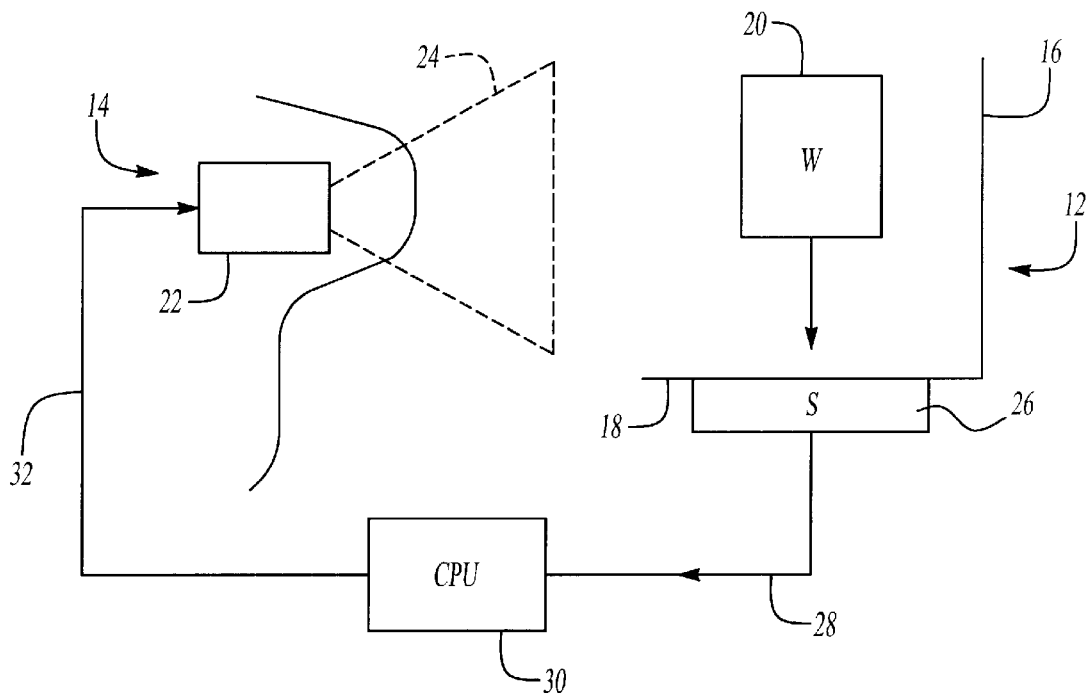
FIG. 1 is a schematic view showing a vehicle with an airbag system and an occupant sitting in a seat with the airbag in an active state.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a force is exerted against the seat bottom 18. The force represents the weight W of the seat occupant 20.

The airbag system 14 has an airbag controller 22 that controls the deployment an airbag 24 under certain collision conditions. The deployment force for the airbag 24, shown in dashed lines in FIG. 1, is modified by the controller 22 according to the weight classification of the occupant 20.

The system preferably includes a sensor assembly 26 mounted adjacent to the seat 12 for measuring the weight of the occupant 20. Any type of sensor assembly known in the art can be used to measure occupant weight. The sensor 26 generates an occupant weight signal 28 that is transmitted to a computer or other central processing or control unit 30. The signal 28 represents an estimated weight designation for the occupant based on measurements taken by the sensor 26. The control unit 30 compares the weight signal 28 to a series of weight classes each having at least one threshold value, assigns a weight class designation to the occupant 20, and generates a control signal 32 that controls and modifies deployment of the airbag 24 based on the weight classification. The classification process will be discussed in greater detail below.

The weight measurements taken by the sensor 26 can vary as the occupant 20 changes seating positions and can vary as the vehicle travels through various maneuvers and over different types of roads. In order to provide a consistent and accurate weight classification, the classification process must filter out these variations. The subject invention monitors the occupant's estimated weight and compares the estimated weight to a series of weight class thresholds to determine an individual classification sample. A history of these class samples is observed and recorded by the control unit 30. Once a predetermined number of consistent and consecutive samples are observed, the class sample is locked as the occupant's weight class. Over time, a plurality of comparisons are made between the estimated weight and the weight class thresholds.

Each weight class is assigned a predetermined upper threshold and a predetermined lower threshold. The number and values for the upper and lower thresholds can be varied. Each weight class sample is determined by comparing the occupant's estimated weight against the previous weight class sample's thresholds. If the estimated weight falls between the upper and lower thresholds for that previous class, the current class sample is set to that last sample. If the estimated weight does not fall between the upper and lower thresholds for that previous class, either the weight class above or the weight class below the previous weight class is set for the current weight class depending on which threshold is crossed. Preferably, only one incremental weight class change is permitted for each iteration. Allowing a change of only one class per iteration helps to smooth the transition between the classes.

Figure 2:
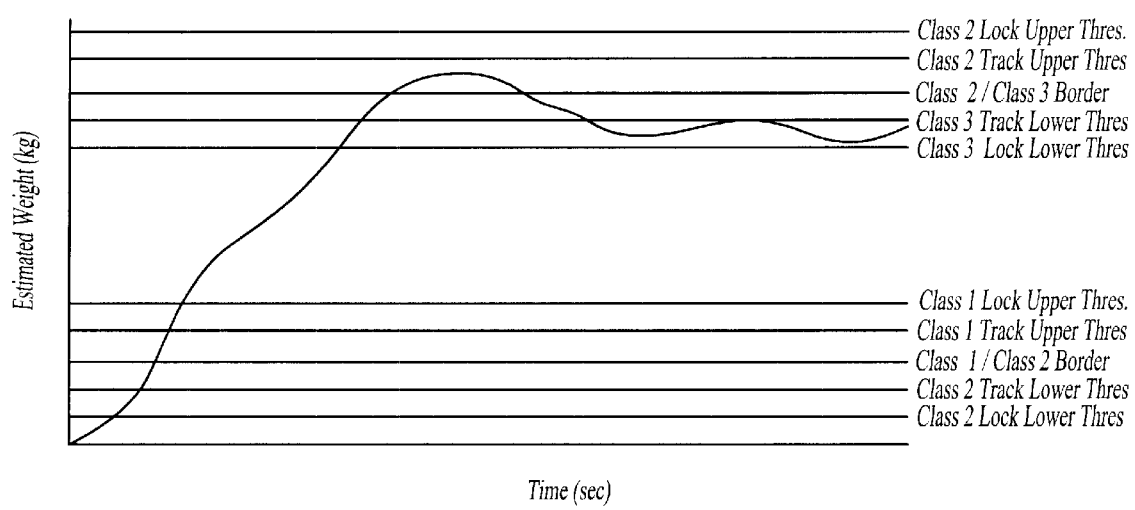
FIG. 2 is a graph showing the relationship between track and lock thresholds.

The upper and lower thresholds for each class varies depending on whether the process is in the track mode or the lock mode. If the system is locked onto a specific weight class, the separation between the upper and lower thresholds for that weight class is increased to provide more hysteresis. By increasing the hysteresis when locked, it is more difficult to change or unlock the weight class designation. This helps to filter out unintended weight class changes, i.e., error induced by adverse road conditions or changes in occupant seating position. FIG. 2 shows the relationship between the track and lock thresholds. Note that the track upper and lower thresholds for weight class two (2) are closer together than the lock upper and lower thresholds for weight class two (2). Thus, the upper threshold for weight class (2) is increased and the lower threshold is decreased when class (2) is the locked class.

Figure 3:
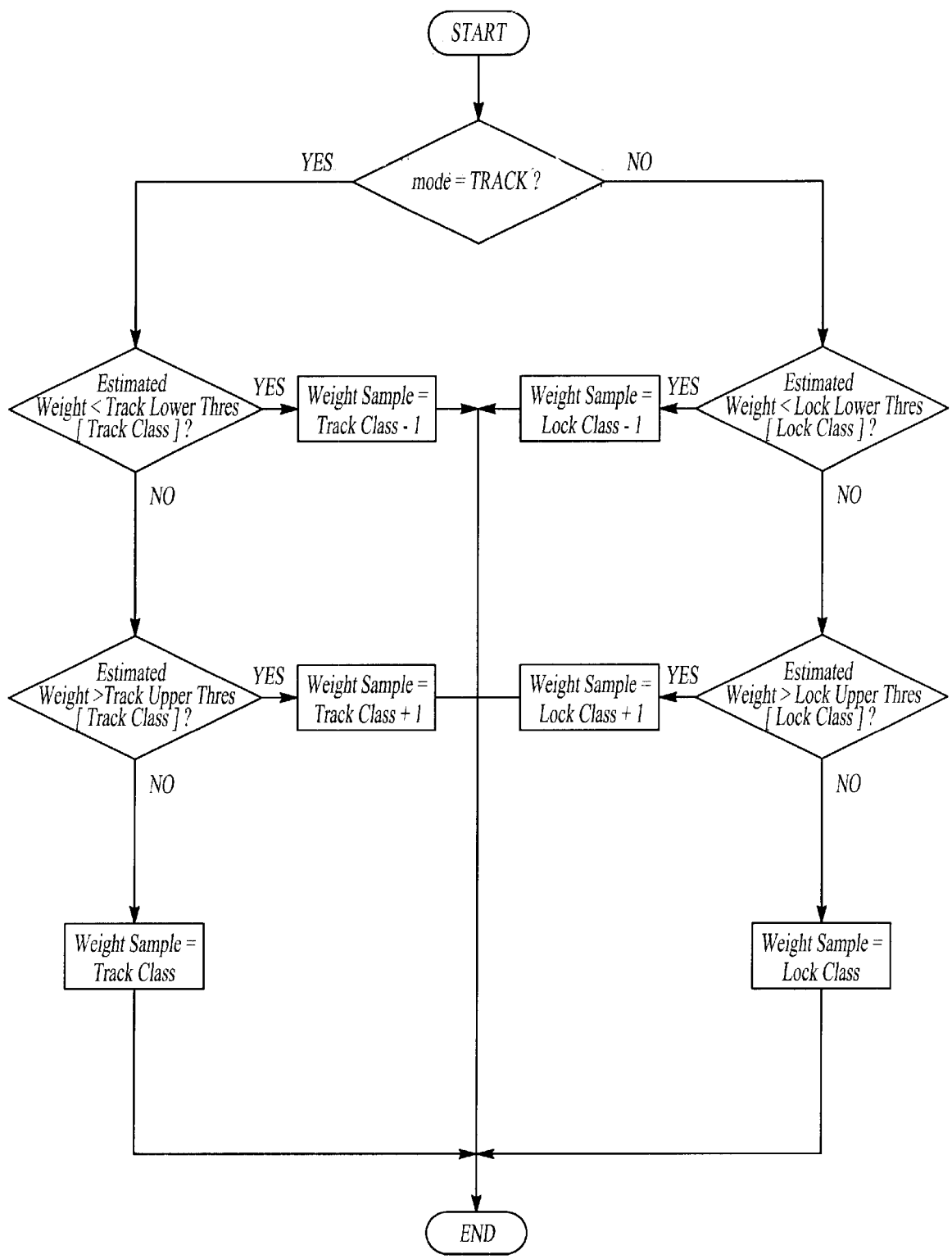
FIG. 3 is a flowchart describing the method of determining a weight class sample.

FIG. 3 is a flow chart showing the process for determining the current weight class sample. When the process is started, there is a determination of whether the process is in the track or lock mode. If the process is in the track mode than the current estimated weight is compared to the previous class' track lower threshold. If the current estimated weight is less than the previous class' track lower threshold than the next lower weight class is set as the current weight class. If the current estimated weight is not less than the previous class' track lower threshold than the estimated weight is compared to the previous class' track upper threshold. If the current estimated weight is greater than the previous class' track upper threshold than the next higher weight class is set as the current weight class. If the current estimated weight is not greater than the previous class' track upper threshold than the current weight class is the same as the previous weight class. A similar method is used when the process is in the lock mode except the current estimated weight is compared to the previous class' lock upper and lower thresholds.

Figure 4:
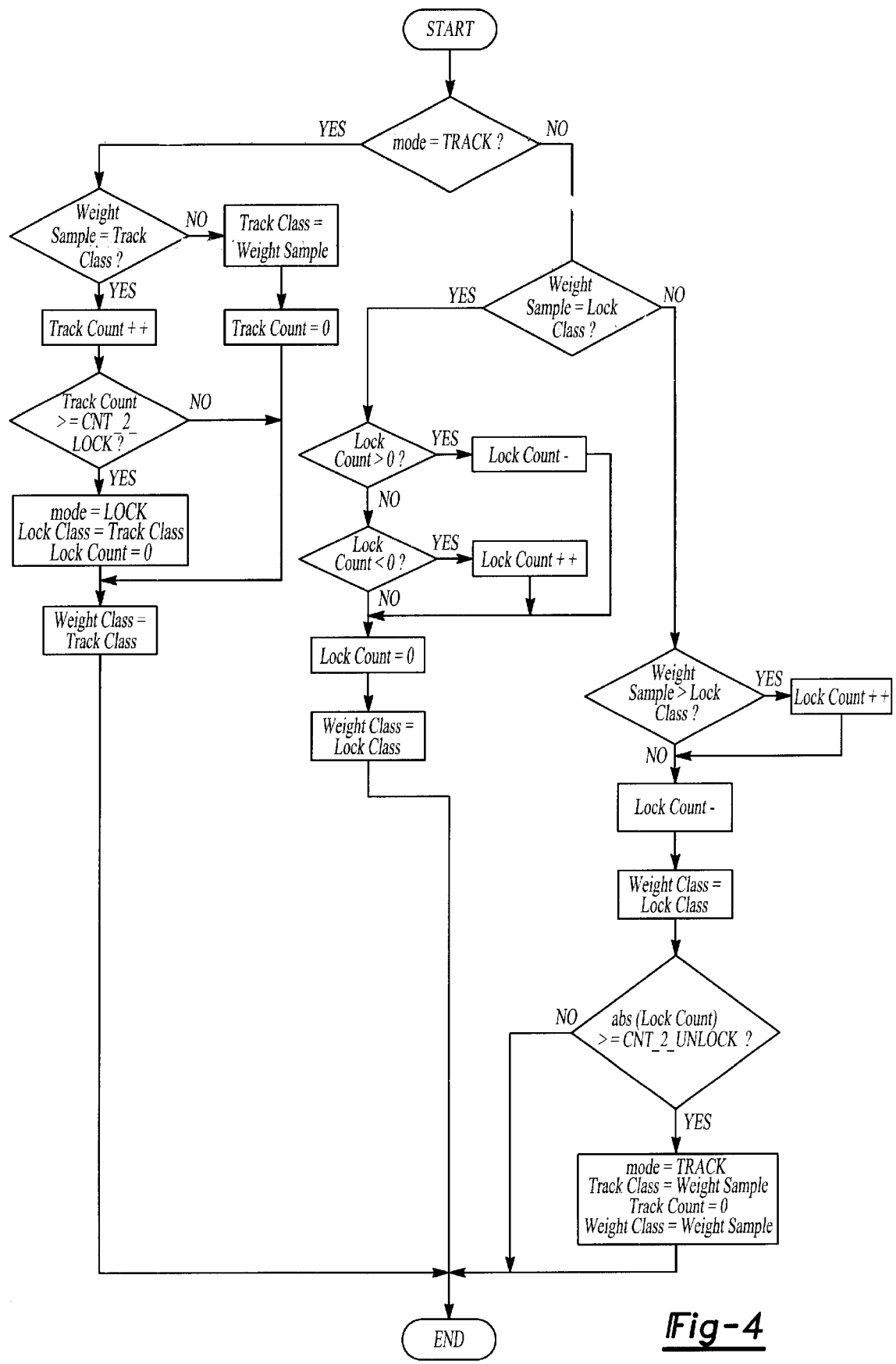
FIG. 4 is a flowchart describing the tracking and locking processes.

As the process moves through each iteration, a history of the comparisons between the estimated weight and the weight class thresholds is observed and recorded, see FIG. 4. The weight class samples are monitored, looking for the same class sample to be repeated. The process starts counting or tracks consecutive samples of the same weight class. If a non-consistent sample is observed, the count is reset to zero. When a predetermined number of consistent and consecutive samples is observed, that observed weight class becomes locked. Once a class is locked, it remains the designated occupant weight class until a specific number of consecutive weight class samples above or below the locked class is observed. If the lock is lost, the process starts tracking the number of consecutive weight classes again and the process is repeated. The output is either the tracked or locked weight class, depending on the mode. If a class is locked, the locked class is the output class. If a class is not locked, the track weight class is the output class. The track/lock feature helps to filter out class changes caused by occupants 20 that change position, class changes caused by adverse road conditions, and class changes resulting from sudden vehicle maneuvers such as turning or braking.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A method for classifying a seat occupant into a weight class comprising the steps of:

(a) measuring the weight of a seat occupant to generate an estimated weight;

(b) comparing the estimated weight to a series of weight classes each having at least one weight class threshold to determine an individual classification sample;

(c) repeating steps (a) and (b) until a predetermined number of individual classification samples having the same value is achieved; and (d) locking the individual classification sample as the occupant weight class.

2. The method according to claim 1 including the steps of generating an occupant weight class signal after step (d), transmitting the occupant weight class signal to a control unit, and modifying deployment of an airbag based on the occupant weight class signal.

3. The method according to claim 2 including the steps of:

(e) unlocking the individual classification sample when a predetermined number of non-equal individual classification samples is achieved; and (f) returning to step (a) when step (e) is satisfied.

4. The method according to claim 3 wherein step (b) further includes assigning each weight class an upper threshold and a lower threshold, comparing the estimated weight to the upper and lower thresholds for the last known weight class, and setting the individual classification sample equal to the last known weight class if the estimated weight is between the upper and lower thresholds for the last known weight class.

5. The method according to claim 4 including the step of setting the individual classification sample equal to a next higher weight class if the estimated weight is greater than the upper threshold for the last known weight class or setting the individual classification sample equal to a next lower weight class if the estimated weight is less than the lower threshold for the last known weight class.

6. The method according to claim 5 including the steps of increasing the value of the upper threshold of the individual classification sample by a first predetermined amount and decreasing the value of the lower threshold of the individual classification sample by a second predetermined amount once the individual classification sample is locked.

7. The method according to claim 5 including the steps of decreasing the value of the upper threshold of the individual classification sample by a first predetermined amount and increasing the value of the lower threshold of the individual classification sample by a second predetermined amount after the individual classification sample is unlocked.

8. The method according to claim 1 further includes the steps of filtering out unintended weight class changes by increasing hysteresis subsequent to locking the individual classification sample by providing a track mode having a first set of thresholds for each of the weight classes and a lock mode having a second set of thresholds for each of the weight classes that is different than the first set of thresholds; and determining whether the track or lock mode is applicable prior to step (b).

9. The method according to claim 8 including the step of providing the first set of thresholds with upper track thresholds and lower track thresholds for each of the weight classes;

providing the second set of thresholds with upper lock thresholds having a value greater than each respective upper track threshold and a lower lock threshold having a value less than each respective lower track threshold;

beginning in the track mode;

initiating the lock mode when a predetermined number of consistent and consecutive individual classification samples is achieved; and changing from the lock mode to the track mode when a predetermined number of inconsistent individual classification samples are achieved.

10. The method according to claim 1 wherein step (c) further includes repeating steps (a) and (b) over a period of time prior to performing step (d).

11. A method for modifying airbag deployment based on classifying a seat occupant into a weight class comprising the steps of:

(a) measuring the weight of a seat occupant to generate an estimated weight;

(b) comparing the estimated weight to a series of weight classes each having an upper threshold and a lower threshold;

(c) assigning the estimated weight to the appropriate weight class and designating the assignment as an individual classification sample;

(d) repeating steps (a) through (c) until a predetermined number of consistent and consecutive individual classification samples are achieved;

(e) locking the individual classification sample as the occupant weight class; and (f) generating a control signal to modify airbag deployment based on the occupant weight class.

12. The method according to claim 11 including the step of unlocking the individual classification sample as the occupant weight class when a predetermined number of inconsistent individual classification samples is achieved before step (f).

13. The method according to claim 12 including the steps of providing a track mode having a first set of thresholds for each of the weight classes and a lock mode having a second set of thresholds for each of the weight classes that is different than the first set of thresholds; and determining whether the method is in the track mode or the lock mode prior to step (b).

14. A method according to claim 13 including the step of filtering out unintended weight class changes by providing the first set of thresholds with an upper track threshold and a lower track threshold for each of the weight classes and providing the second set of thresholds with an upper lock threshold having a value greater than the upper track threshold and a lower lock threshold having a value less than the lower track threshold.

15. A method according to claim 14 including the step of beginning in the track mode, initiating the lock mode when a predetermined number of consistent and consecutive individual classification samples is achieved, and moving from the lock mode to the track mode when a predetermined number of inconsistent individual classification samples is achieved.

16. An occupant weight classification system comprising;

a sensor assembly for measuring the weight of a seat occupant to generate an estimated weight signal;

a series of weight class data wherein each weight class has an upper threshold and a lower threshold;

a control unit for receiving said estimated weight signal, comparing said signal to said upper and lower thresholds to assign said signal an appropriate weight class designation, and for locking said signal into an occupant specific weight class when a predetermined number of consistent and consecutive weight class designations is achieved.

17. A system according to claim 16 wherein said control unit compares said estimated weight signal to said series of weight class data over a period of time prior to locking said signal into said occupant specific weight class.

18. A system according to claim 17 wherein said control unit operates in either a track mode having a first set of thresholds for each of the weight classes or a lock mode having a second set of thresholds for each of the weight classes that is different than the first set of thresholds and wherein said control unit and determining whether the track or lock mode is applicable prior to comparing said signal to upper and lower thresholds for said weight classes.

19. A system according to claim 18 wherein said first set of thresholds have upper track thresholds and lower track thresholds for each of said weight classes and said second set of thresholds have upper lock thresholds having a value greater than each respective upper track threshold and a lower lock threshold having a value less than each respective lower track threshold to filter out unintended changes in weight class designation and wherein said control unit operates initially in said track mode, activates said lock mode when said predetermined number of consistent and consecutive weight class designations is achieved, and changes from said lock mode to said track mode when a predetermined number of inconsistent individual classification samples is achieved.

20. A system according to claim 16 including an airbag controller for controlling deployment of an airbag wherein said control unit generates a control signal and transmits said control signal to said airbag controller to modify deployment of said airbag based on said occupant specific weight class.

* * * * *